United States Patent
Hovis et al.

(10) Patent No.: US 7,477,995 B2
(45) Date of Patent: Jan. 13, 2009

(54) OPTICAL LINEAR STRAIN GAGE

(75) Inventors: Gregory Hovis, Martinez, GA (US); Reginald I. Vachon, Atlanta, GA (US)

(73) Assignee: Direct Measurements Inc., Atlanta, GA (US)

( * ) Notice: Subject to any disclaimer, the term of this patent is extended or adjusted under 35 U.S.C. 154(b) by 76 days.

(21) Appl. No.: 11/048,862

(22) Filed: Feb. 3, 2005

(65) Prior Publication Data

US 2006/0173638 A1    Aug. 3, 2006

(51) Int. Cl.
*G01L 5/00*    (2006.01)
*G06F 19/00*    (2006.01)

(52) U.S. Cl. .............................. 702/42; 73/808; 356/32

(58) Field of Classification Search ............. 702/41–42; 73/766, 769, 788, 789, 794, 799, 800, 808; 356/32

See application file for complete search history.

(56) References Cited

U.S. PATENT DOCUMENTS 4,591,996 A    5/1986    Vachon .......................... 702/42

6,934,013 B2 *    8/2005    Vachon et al. ................. 356/32

OTHER PUBLICATIONS

U.S. Appl. No. 10/890,994, filed Jul. 15, 2004, Vachon et al.
"Code 39 Barcode FAQ and Tutorial," http://www.idautomation.com/code39faq.html (printed Feb. 2, 2005).
"Application of Data Matrix Identification Symbols to Aerospace Parts Using Direct Part Marking Methods/Techniques," NASA-HDBK-6003, Jul. 2, 2001.

\* cited by examiner

*Primary Examiner*—John H Le
(74) *Attorney, Agent, or Firm*—Jacobson Holman PLLC

(57) ABSTRACT

An optical linear strain gage includes a target, a sensor, and a computer, wherein the target contains a gage length defined by end points. The target can be a one-dimensional barcode, the gage length defined between, and perpendicular to, two chosen parallel lines of the barcode. The target, including a gage length, is associated with an object such that deformation of the gage length and deformation of the object are the same; target can emit or reflect a detectable physical quantity. The sensor is compatible with and pre-processes the physical quantity from the target and provides data to the computer. The computer analyzes the data output and calculates the strain directly on the body based on the pre-processed and analyzed data. Measuring strain on an object using the strain gage includes identifying the changes in the gage length as a function of time and load applied and calculating strain.

4 Claims, 7 Drawing Sheets

FIG. 5
(Prior art)

OPTICAL LINEAR STRAIN GAGE

FIELD OF THE INVENTION

The present invention relates to strain gages, and particularly to an optical linear strain gage that can measure strain directly, as well as assess fatigue damage, based on the deformation of a target associated with a body for which strain is to be measured. More specifically, the invention relates to an optical linear strain gage employing a target containing a gage length.

BACKGROUND OF THE INVENTION

Strain, $\epsilon$, is a dimensionless ratio that indicates the deformation of an object subjected to a stress, for example from an external force or due to expansion or contraction based on a change in temperature or other physical characteristic. Strain can occur in any direction of a coordinate system. Uniaxial strain is strain resulting from a stress exerted in one direction only (that is, along only one axis of) a coordinate system. FIGS. 1A and 1B illustrate a case of uniaxial strain on a rod of initial length, L, which is stretched to a length, $L^1$. As shown in FIG. 1A, the strain is defined as the change in length, $L^1-L$, with respect to the original length, L, or $$\epsilon = (L^1-L)/L$$

The initial length, L, is referred to as the "gage length," the strain sensitive length of the strain gage, and in this example the strain is the change in length over the gage length.

As shown in FIG. 1B, strain at a point is defined by considering an arbitrary point, P, which has a position vector, x, and its infinitesimal neighbor, dx. Point P shifts to $P^1$, which has a position vector $x^1$ after application of a load; meantime, the small increment of change in length is $dx^1-dx$, and strain at a point is $$\epsilon = (dx^1-dx)/dx = du/dx$$

Thus, two points defining a straight line on the surface of a body can be chosen to define a gage length. If the distance between the points changes over time relative to the gage length due to deformation of the surface, the average strain over the gage can be determined. Strain is shown in FIG. 1 relative a tensile force but the development is equally valid for a compressive force.

Technical efforts by Vachon and Ranson (see U.S. Pat. No. 4591,996 and U.S. application Ser. No. 10/890,994) have continued in the area of optical correlation of surface images to detect strain. Specifically, these efforts include, among other things: (1) optical detection of edges of images on surfaces as well as optical detection of edges of surfaces, (2) optical correlation of dot and other geometric patterns applied to surfaces, and (3) optical correlation of the movement of centroids of geometric patterns applied to surfaces. All of these analytical and experimental efforts have been directed to optical detection of strain.

Single-element electrical strain gages and electrical resistance gages arranged in a rosette pattern employ analog techniques, rather than measuring strain directly. Previous optical correlation techniques calculate strains using a convolution integral, and also do not measure strain directly.

It is to the provision of a strain gage that can measure strain directly, as well as assessing fatigue damage, that the present invention is directed.

BRIEF SUMMARY OF THE INVENTION

Definitions and abbreviations used herein are as follows:

Calculating—determining a value using a mathematical model of a physical model of a phenomenon or a phenomenological equation.

Code 39 standard barcode—Code 39 is widely used in many industries and is the standard for many government barcode specifications, including the U.S. Department of Defense. Code 39 is defined in American National Standards Institute (ANSI) standard MH10.8M-1983, and is also known as USD-3 and 3 of 9.

The Code 39 character set includes the digits 0-9, the letters A-Z (upper case only), and the following symbols: space, minus (−), plus (+), period (.), dollar sign ($), slash (/), and percent (%). A special start/stop character is placed at the beginning and end of each barcode. The barcode may be of any length, although more than 25 characters really begins to push the bounds.

Each character consists of 9 elements: 5 bars and 4 spaces. Each character includes 3 wide and 6 narrow elements. The barcode derives its name from its configuration of nine white and black bars in each code, three of which are wide—three "wide," of nine, "bars." Characters are separated by an inter-character gap, which is the same width as a narrow bar. The ratio of wide: narrow bar width may be in the range of 1.8 to 3.4. Barcodes with a narrow bar width of less than 0.020 inches (0.508 mm) should have a ratio of at least 2.5. A ratio of 3.0 is recommended. Every Code 39 barcode should be preceded and followed by a quiet zone the width of at least 10 narrow bars.

Code 39 does not require a checksum, although a modulo 43 check digit may be appended for increased data integrity (the Mod 43 checksum is seldom used). Code 39 is just about the only type of barcode in common use that does not require a checksum. This makes it especially attractive for applications where it is inconvenient, difficult, or impossible to perform calculations each time a barcode is printed. For example, when performing a word processor merge operation there is generally no easy way to calculated a checksum if one of the merge data fields is to be bar-coded. With Code 39, however, no checksum is needed; the merge template document must simply add a fixed asterisk (*) before and after the data and print the field using a Code 39 barcode font.

Edge—a dramatic change in pixel brightness values between regions. It is the point or points that has or have the greatest amount of contrast difference (change in intensity values) between pixels. See "Application of Data Matrix Identification Symbols to Aerospace Parts Using Direct Part Marking Methods/Techniques," NASA-HDBK-6003, Jul. 2, 2001.

Fatigue damage (accumulated damage)—the cumulative or irreversible damage incurred in materials caused by cyclic application of stresses and environments resulting in degradation of load carrying capacity. See "Application of Data Matrix Identification Symbols to Aerospace Parts Using Direct Part Marking Methods/Techniques," NASA-HDBK-6003, Jul. 2, 2001.

Gage length—the strain sensitive length of the strain gage; also defined as the original length of that portion of the specimen over which strain, change of length, and other characteristics are measured.

Measuring—determining a magnitude with reference to a standard of measurement.

One-dimensional (or linear) barcode—a single row of dark lines and white spaces of varying but specified width and height, in which the symbology can be read by drawing a straight line through any part perpendicular to the rows.

Quiet zone—areas of high reflectance (spaces) surrounding a machine-readable symbol. Quiet zone requirements may be found in application and symbology specifications. Sometimes called "Clear Area," or "Margin."

Stress at a point—the state of stress about a point in a body, defined by nine orthogonal stresses (three normal and six shear) that form a second-rank tensor.

Symbology—a machine-readable pattern composed of quiet zone, finder pattern, and symbol characters (which include special functions and error detection and/or correction characters) required by a particular symbology.

It is accordingly a primary object of the present invention to provide a strain gage that measures strain directly, as opposed to measuring strain by analog techniques.

It is another object of the present invention to provide an optical linear strain gage employing a target that uses a one-dimensional barcode or any symbol or naturally occurring conditions that allow definition of a gage length.

These and other objects of the invention are achieved by provision of a linear strain gage comprising a target, a sensor, and a computer, wherein the target contains a pair of end points or end lines, and a gage length defined by the end points or end lines.

The target can be any symbol or man-made or naturally occurring object that meets the requirement of containing end points or end lines and a gage length defined by the end points or end lines. The target can be a set of parallel lines in the form of a linear barcode, including but not limited to the Code 39 standard barcode, any two of the parallel lines being chosen to define the gage length, with the gage length being perpendicular to the chosen parallel lines.

The target can be identified by observing naturally occurring marks or objects that define a gage length, including a linear barcode. The target can be applied directly or indirectly to the surface of a body for which strain is to be measured, or identified in a pre-existing pattern. Whether applied or identified, it can be covered by paint or other material. The target can also be embedded in the object for which strain is to be measured.

In one embodiment of the invention, the target is a one-dimensional barcode, as for example a one-dimensional barcode based on the Code 39 barcode standard, including start and stop characters and a sequential string of a plurality of intermediate characters that hold the actual coded information, each character being defined by a total of nine bars and spaces.

There are an infinite number of image configurations for a target, such as a one-dimensional barcode, having parallel lines perpendicular to the gage length. In a one-dimensional barcode, the end points of the gage length are contained in the parallel lines, or more precisely, at one edge of the parallel lines; and as the lines shrink in width, the points are bounded by the two edges of the lines. The end points of the gage length are monitored by the sensor to detect displacement relative to each other and hence strain.

The target must be associated with an object (by application or identification) in such a way that the deformation of the target's gage length and the deformation under load of the object with which it is associated (that is, to which it is applied or on which it is identified) bear a one-to-one relationship. The target is monitored—by an optical, magnetic, electromagnetic, acoustic, or other sensor, as appropriate—either on a continuous basis, at random times triggered by an external event, or at pre-determined intervals. The images of the target's gage length are correlated to detect the movement of the end points defining the gage length, and the movements are quantified and utilized in analytical expressions to determine strain in the directions of the coordinate system used corresponding to the plane of the surface under study. The movement of end points is detected by a computer-implemented program in accordance with the present invention, which identifies the gage length, correlates the gage length prior to deformation to the distance between the end points after deformation, determines the change in length, and then divides the change by the gage length, and utilizes the change in length and the gage length as input for strain equations as described hereinafter and to yield and display linear strain.

The target can naturally emit a detectable physical quantity (as, for example, a material that naturally emits a magnetic field), emit a detectable physical quantity upon external stimulation (as, for example, a material that creates a magnetic field when subjected to a current or a material that emits light when stimulated by an electric field), or reflect a detectable physical quantity; and the physical quantity can be a signal in any bandwidth of the electromagnetic spectrum (including the audio frequency range), or it can be a field such as a magnetic field. The target is scalable, in that it can be produced and sensed on a scale ranging from microscopic to macroscopic.

The sensor observes the deformation of a target affixed to a surface or embedded in a material or an object, and the deformation of the target, if any, over time. The sensor is selected to be compatible with the detectable physical quantity emitted by the target and undertakes some pre-processing of the observed physical quantity to provide data representing the physical quantity to the computer. The computer implements programs that analyze the data, and store and display the data and strain calculation in real time as the object under study is submitted to loading resulting in strain. The technology is scalable with respect to the size of the object under study.

The method in accordance with the present invention employs correlation of the displacement of the end points defining the gage length. The correlation can be optical, acoustical, magnetic, or electromagnetic.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 5 is a table of the characters that can be encoded in each of the alphanumeric locations of the linear strain gages of FIGS. 3 and 4 the colors being inverted for easier reading.

DETAILED DESCRIPTION OF THE INVENTION

Figure 1A:
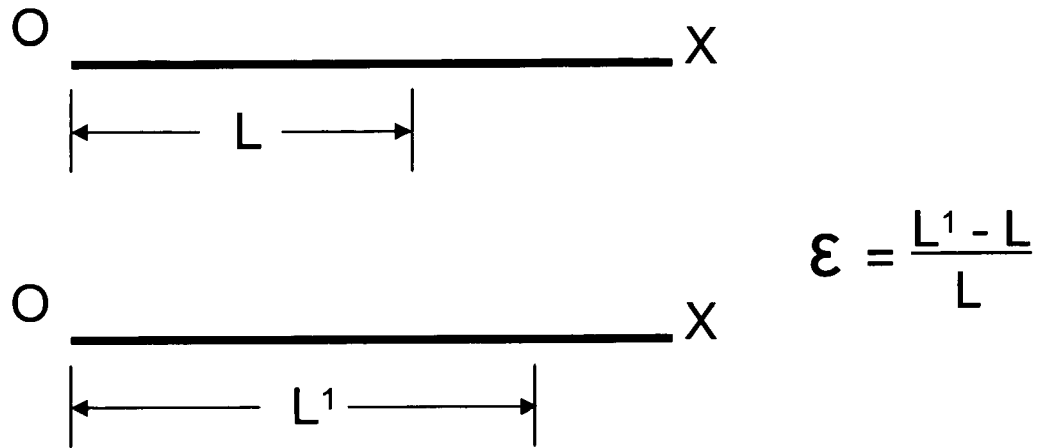
FIGS. 1A and 1B are diagrammatic illustrations of uniaxial strain and the definition of gage length.
Figure 1B:
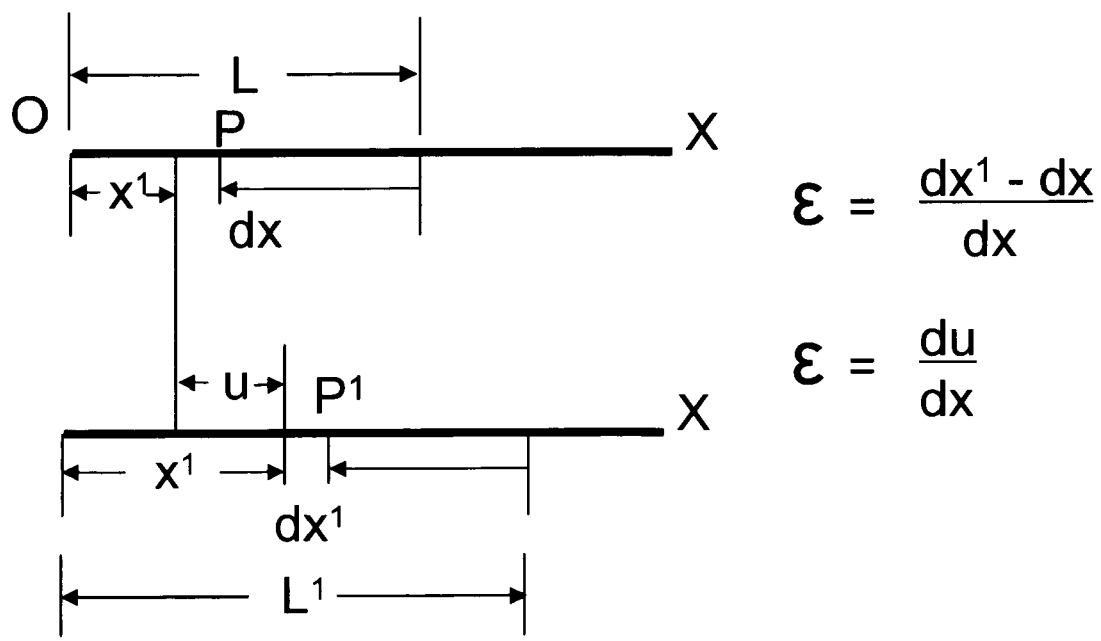

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 2:
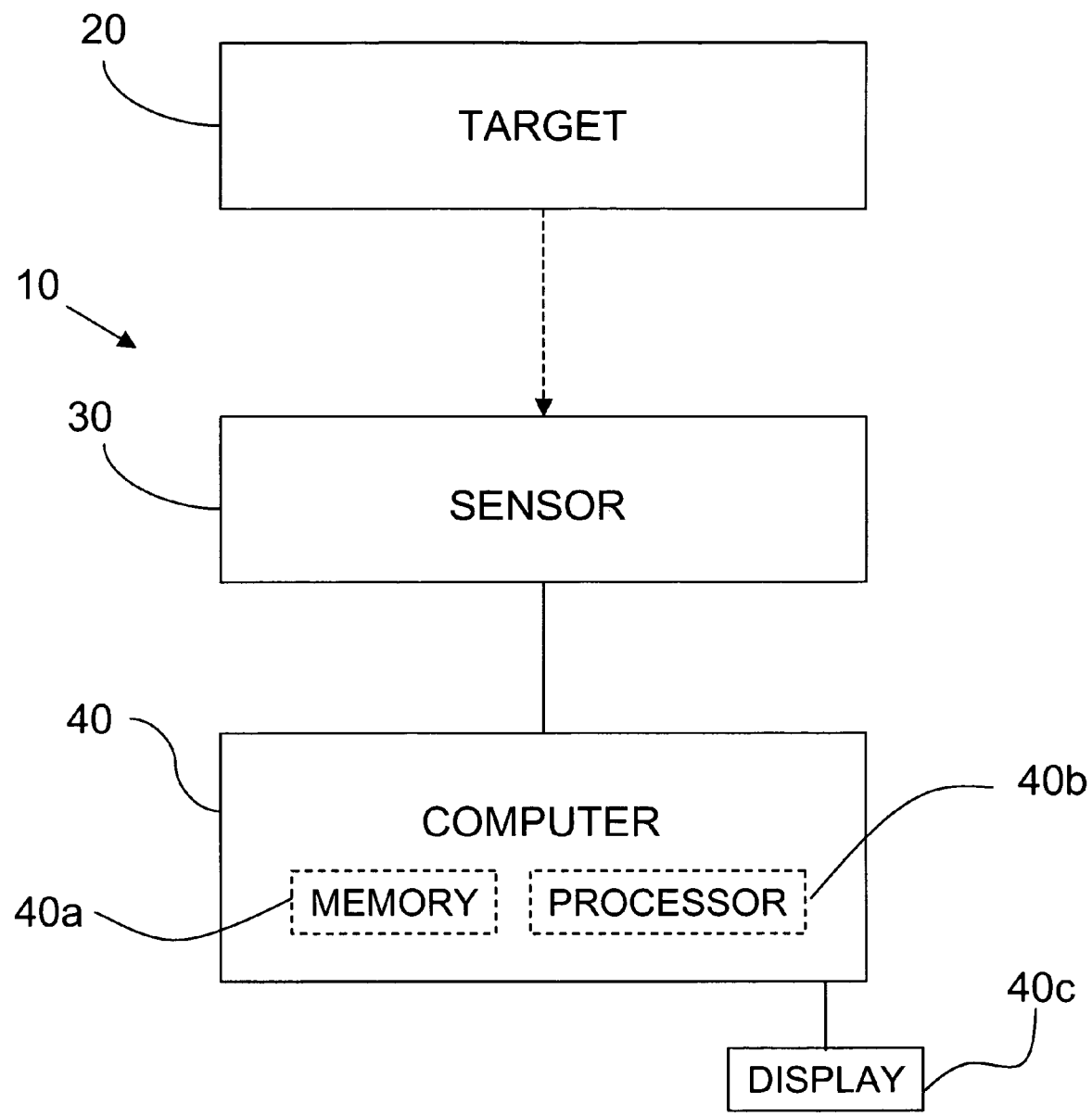
FIG. 2 illustrates the schematic of the process for the linear strain gage in accordance with the present invention.
Figure 3:
FIG. 3 illustrates a target of a linear strain gage in accordance with the present invention for a barcode.
Figure 4:
FIG. 4 illustrates an alternate embodiment of a target of a linear strain gage in accordance with the present invention.

Referring now to FIG. 2, there is shown diagrammatically an optical strain gage 10 in accordance with the present invention, comprising a target 20, a sensor 30, and a computer 40. The target contains a gage length defined by a pair of end points. The target can be a set of parallel lines in the form of a one-dimensional barcode that has been manufactured or identified, the gage length being perpendicular to two chosen parallel lines, and the end points being contained in a pair of the parallel lines. There are an infinite number of image configurations for the linear gage with the present invention, two examples of which are shown in FIGS. 2 and 3, to be discussed in greater detail hereinafter. Both of the one-dimensional barcodes 120 and 120' shown in FIGS. 3 and 4 are examples of targets that satisfy the conditions for optically detecting strain when affixed to a surface undergoing load and deformation.

Figure 7:
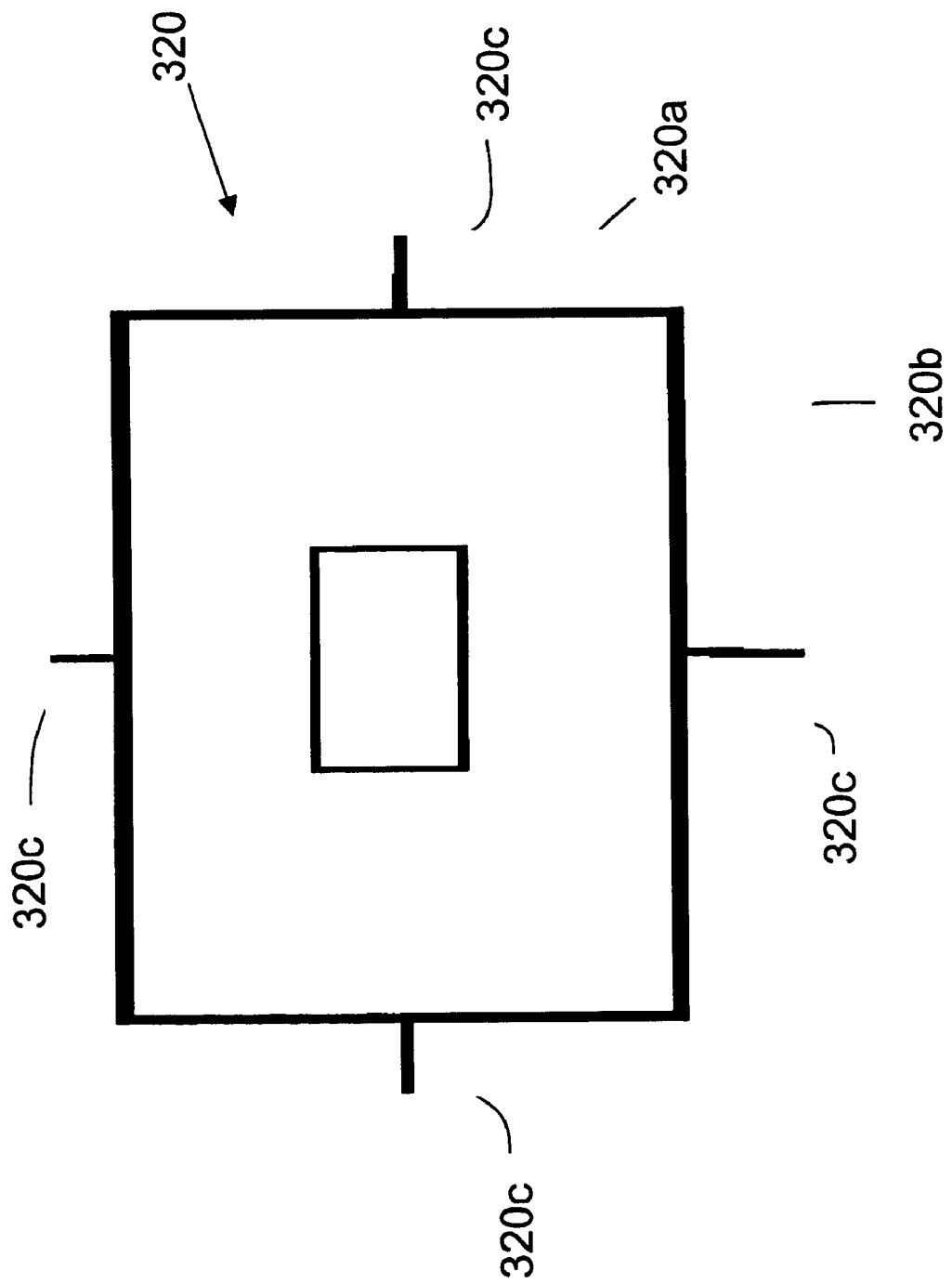
FIG. 7 is another embodiment of a target in accordance with the present invention.

Whether manufactured or identified, the gage length is defined in terms of its physical dimensions. Engineering strain (also called "elongation") is a measure of the change in length, $L^1-L$, with respect to a reference dimension of the target, specifically, its gage length, L. This reference dimension is usually taken relative to an undeformed position (zero loading). Any quantity in the target, including a one-dimensional barcode used as a target, must identify a geometrical property that can describe a point. Examples of such a point are a point along the edge of one of the parallel lines of a linear barcode or one of the end points of the gage length of a target 220 other than a linear barcode, as seen in FIG. 7. The target shown in FIG. 7 comprises a pair of nested, concentric rectangles 220a and 220b, and four short lines 220c, each line extending perpendicular from a respective side of the outer rectangle 220b at its midpoint. The corners of the rectangles and the intersection of the short lines 220c with the midpoints all define points that can be used as end points to define a gage length. In a linear barcode, a point can be uniquely identified on the edge of one of the parallel lines in the same plane as and perpendicular to the parallel lines of the linear barcode. Alternatively, the end points of the gage length can be considered as a property of the gage for the purpose of strain measurement.

In accordance with the present invention, the target can comprise a linear, or "one dimensional," barcode." One example of such a linear, or "one dimensional" barcode is a one-dimensional barcode based on the Code 39 barcode standard. Although the invention is described with reference to a Code 39 barcode, any two parallel lines of any linear or one dimensional barcode can be chosen to define a gage length perpendicular to the two chosen parallel lines. Other barcodes that can be used include, but are not limited to, CODABAR, Code 128, Code 25, Code 93, EAN 128, EAN 13, EAN 8, MSI, JAN 13, JAN 8, Plessey, Telepen, UPCA, UPC C, Data Matrix, PDF 417, MICRO PDF 417, RSS Expanded, and RSS Limited.

Figure 5:
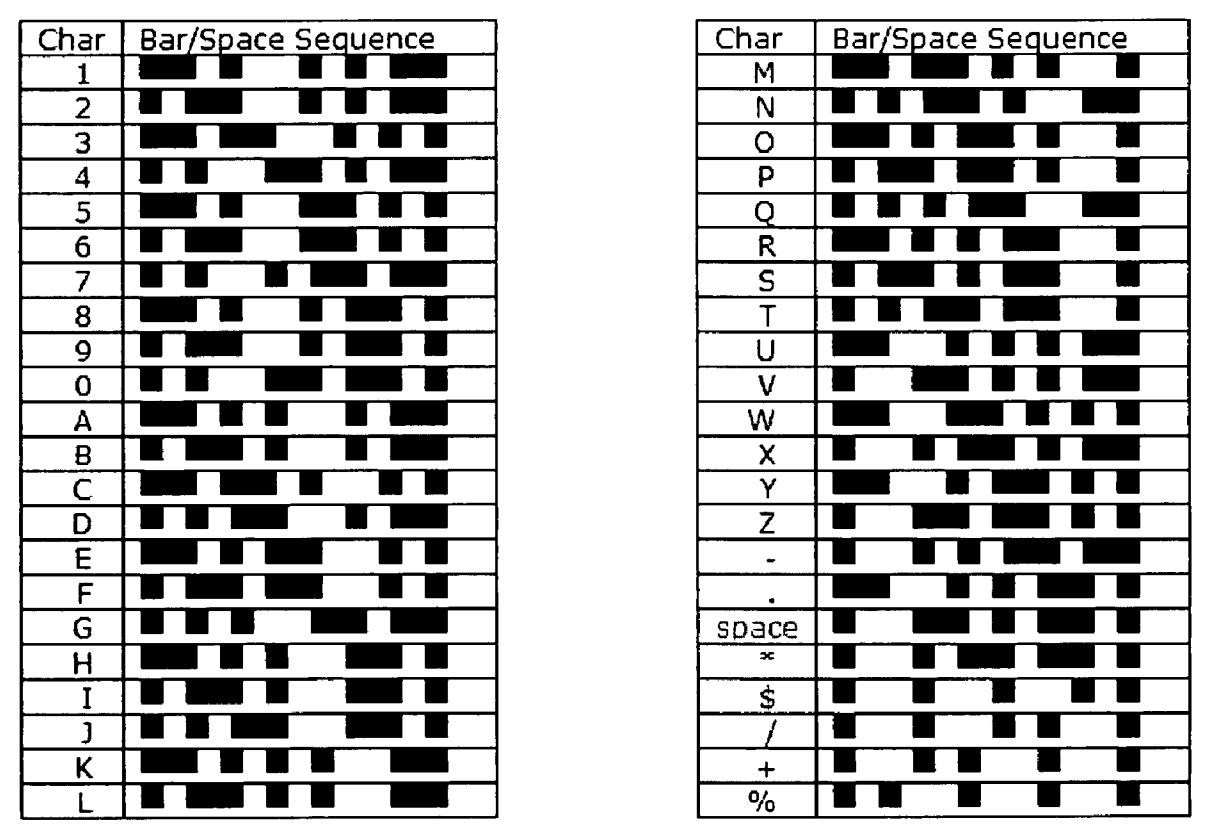

A first embodiment of a target 120 in the form of a linear barcode in accordance with the present invention is shown in FIG. 3. Consistent with the Code 39 barcode standard, the linear barcode includes start and stop characters and a sequential string of a plurality of intermediate characters that hold the actual coded information, each character being defined by a total of nine bars and spaces. For illustrative purposes, the linear barcode of FIG. 3 encodes seven alphanumeric characters, although there is no limit on the total number of alphanumeric characters in the linear barcode, other than the physical size of the linear barcode, which is dictated by the particular application. Also consistent with the Code 39 barcode standard, the sequential string of five intermediate characters is separated from the start and stop characters by a single "narrow," space. The stop and start characters are the letter "A," causing the barcode to begin and end with a wide bar. For illustrative purposes, the intermediate characters shown in FIG. 3 are the numerals "12345." However, as will be appreciated by those of skill in the art, the five intermediate characters can be any unique sequence of the 44 alphanumeric characters specified by the Code 39 barcode standard. FIG. 5 illustrates these 44 characters and their encoding, the colors being inverted in FIG. 5 for ease of reading.

The physical size and layout of the linear barcode (including its quite zone) are important for imaging purposes, and are also important for physical handling, bonding, etc. The ratio of wide bars to narrow bars is 2:1, with the narrow bars and spaces having a width of 0.0039 inch (0.0099 cm) and the wide bars and spaces having a width of 0.0078 inch (0.0198 cm). With these width dimensions for the bars and spaces, the actual physical dimensions of the seven character target 120 illustrated in FIG. 3 would be 0.350 inch×0.150 inch (0.889 cm×0.381 cm), while the physical dimensions of the coupon would be 0.400 inch×0.200 inch (1.016 cm×(0.508 cm).

Although the linear barcode used herein for illustration is based on the Code 39 barcode standard, it deviates from this standard in several important respects. First, in the linear barcode used as a target 120, the start and stop character is the letter "A," whereas in the Code 39 barcode standard, the start and stop character is the character "*" (asterisk). Second, in the linear barcode used as a target 120, the ratio of wide bars to narrow bars is 2:1, whereas in the Code 39 barcode standard, the ratio of wide bars to narrow bars is in the range of 2.2:1-3:1. The Code 39 barcode standard dictates a ratio in the range of 2.2:1-3:1 due to inaccuracies of most printing and reading methods. The imaging capabilities of the present invention permit the use of the lower 2:1 ratio, which in turn enables more information to be fit into the same physical space. Third, the linear barcode used as a target 120 includes a perimeter 120a (that is, a border on all four sides), which incorporates the conventional barcode quiet zone. Fourth, as shown in FIG. 4, in an alternate embodiment, the linear barcode used as a target 120' may include human-readable encoded information 120b, such as the alphanumeric characters represented by the bars themselves, which is not required by the Code 39 barcode standard.

In order to provide for accurate imaging, the barcode used as a target 120 or 120' in accordance with the present invention has white bars on a black background.

The target can be covered by paint or other material, or it can be embedded in the object for which strain is to be measured.

The target in accordance with the present invention can be used for small item marking applications using a wide variety of printing and marking technologies.

The target can be associated with an object by any means that results in the deformation of gage length with the deformation under load. The deformation of the gage length and the object must bear a one-to-one relationship. The target can be associated with an object for which strain is to be measured by applying it directly or indirectly to the surface of the object; or by identifying it in a pre-existing pattern that contains a gage length. Whether applied or identified, the target can be embedded in the object for which strain is to be measured.

Examples of application of a target include, but are not limited to:

1. Application to a medium such as a polymide film that is bonded, for example by gluing, to the surface of the object for which strain is to be measured (indirect application);
2. Etching on a surface (direct application);
3. Painting on surface (direct application); and
4. Printing on a surface (direct application).

Target applications are described in detail in NASA STD 6002 and Handbook 6003 can be used for the linear barcode although developed for the 2-D barcode Examples of identification of a target include, but are not limited to:

1. Identification by observing naturally-occurring surface features of the object that define a "gage length," of a linear gage on a macroscopic or microscopic scale (for example, features on the surface of the earth).
2. Identification by observing naturally-occurring subsurface features of the object that define a "gage length," of a linear gage on a macroscopic or microscopic scale (for example, a fossil buried in the earth).
3. Identification by observing manmade surface features of the object that define a "gage length," of a linear gage on a macroscopic or microscopic scale (for example, a collection of components).
4. Identification by observing manmade subsurface features of the object that define a "gage length," of a linear gage on a macroscopic or microscopic scale (for example, structural elements of a spacecraft covered with a skin, the structural elements of a bridge covered with a skin, or the structural elements of a building having a surface opaque in the visible spectrum).

Examples of embedding of a target include, but are not limited to:

1. Embedding in the object to be studied when the object is being formed;
2. Identification of naturally occurring or manufactured subsurface features;
3. Covering with an overlying material, such as one or more layers of paint; and
4. Implanting in a human body, in a body part or an implant. For example, if the target is affixed to a critical area of a hip joint or a hip implant, or to an artificial heart valve, the target can be viewed through the tissue surrounding the target by an x-ray sensor, and the strain and fatigue damage to the associated body part or implant can be assessed over time.

The target can naturally emit a detectable physical quantity, create a detectable physical quantity, or reflect a detectable physical quantity. The detectable physical quantity can be a signal in any portion of the electromagnetic spectrum (including the audio frequency range), or it can be a field such as a magnetic field. The detectable physical quantity can be a signal that can be characterized as a gray-scale image that can be converted into a bitmap file. Sensors that will sense various detectable physical quantities, including all these signals and fields, are commercially available.

The target is scalable, in that it can be produced and sensed on a scale ranging from microscopic to macroscopic. Thus, the optical linear strain gage in accordance with the present invention is applicable to very large applications such as viewing a target on earth from space to determine displacements/strain of the earth's surface or subsurface strains. All that is required is to match the sensor to the size of the target image and the detectable physical quantity emitted by the target.

One advantage of the optical linear strain gage in accordance with the present invention is that strain is measured directly, as opposed to being inferred from secondary measurements using analog techniques; thus making possible an explicit detectable "reading," of normal and shear strain components. This in turn leads to greater accuracy and reduced system errors.

Another advantage of the optical linear strain gage in accordance with the present invention is that the range of strain measurements is easily from 0 to at least 50%, which permits measurements of strain in elastic materials such as rubber and plastic. The potential exits to cover measurements at the nanoscale level.

A third, and major advantage of the optical linear strain gage in accordance with the present invention is that subsurface strains can be measured. Subsurface measurements can have special applications in man-made composites.

The optical linear strain gage in accordance with the present invention also can be used in the assessment of fatigue damage (accumulation) in critical areas of structures or components of devices subjected to cyclic or other loadings. This is accomplished by observing the area of a component under study over a selected period of time during the normal usage of the area. The data can then be used to predict failure of the component.

The sensor observes the deformation of a target affixed to a surface or embedded in a material by capturing the total image of the target and transmitting it to the computer. The sensor is selected to be compatible with the detectable physical quantity emitted by the target and undertakes some preprocessing of the observed physical quantity to provide data representing the physical quantity to the computer. In the case of a one-dimensional barcode or "gage length," that can be monitored optically, the input signal to the sensor may be a grayscale image that can be converted into a bitmap file, although other inputs can be accommodated.

As shown in FIG. 2, the computer conventionally comprises memory 40a for storing programs and data and a processor 40b for implementing the programs and processing the data, and is associated with a display 40c for displaying data. As the object under study is submitted to loading resulting in strain, the computer implements programs that (1) identify the gage length and the changes therein as a function of time and change in the load, (2) translate the changes in the gage length into strain, and (3) display it in a suitable format. The display of the data can take place in real time. The technology is scalable with respect to the size of the object under study.

The gage length is monitored—by optical, magnetic, electromagnetic, acoustic, or other sensor, as appropriate—at successive periods of time, either on a continuous time, at random times triggered by an external event, or on a programmed time basis.

The mathematical basis of the invention is the correlation of the movement of the end points of the gage length with the gage length.

A gage length in accordance with the present invention can be devised for any coordinate system or can be identified by analysis of a pre-existing symbol or other pattern so that it can be used as a target in the method in accordance with the present invention. The movement of the end points of the gage length in the image of the target can be utilized with the strain equations written for the coordinate system used to determine strain optically and the computer program in accordance with the present invention is applicable to any coordinate system and sub-image geometric shape.

Figure 6:
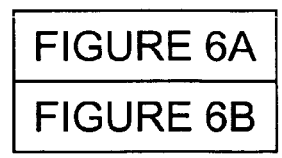
FIGS. 6A and 6B together are a high level flow diagram illustrating the algorithm followed by the computer program in accordance with the present invention.
Figure 6A:
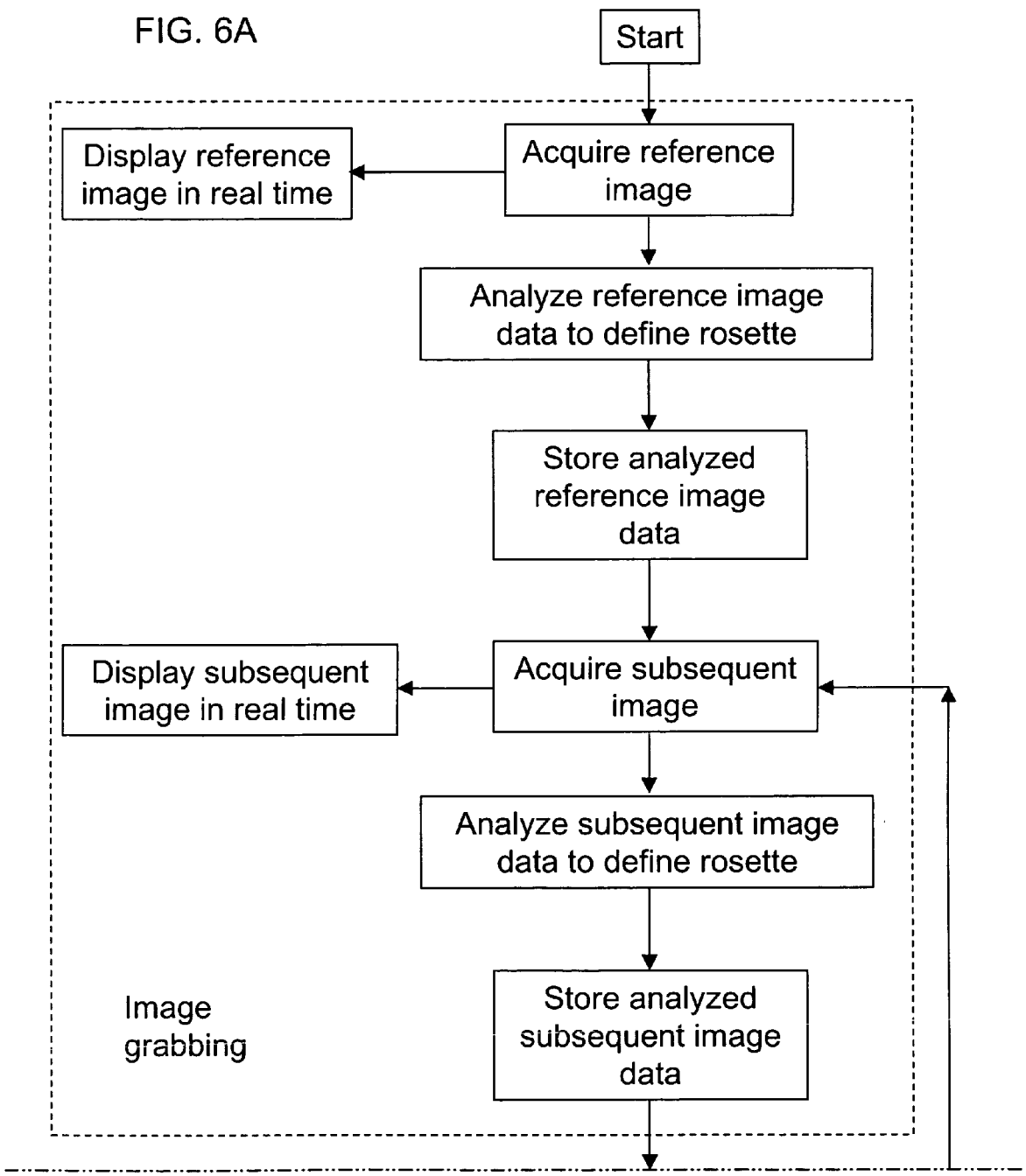
Figure 6B:
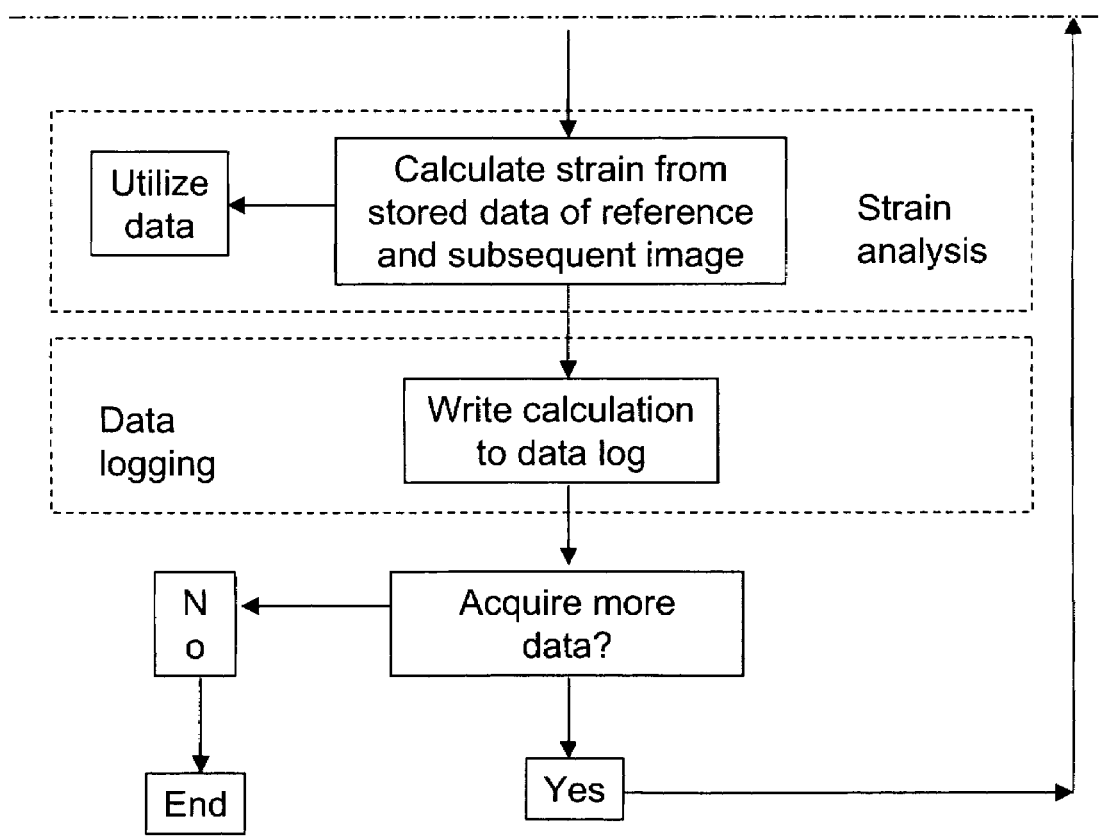

Referring now to FIGS. 6A and 6B together, there is shown a high level flow diagram illustrating the algorithm followed by the computer programs in accordance with the present invention. The algorithm comprises three basic stages, image grabbing, strain analysis, and data logging; and utilizes two types of images, a reference image, acquired either without application of a load or with a reference load on the object for which strain is to be measured, and subsequent images, acquired after the reference image in the presence of a load or change to the load on the object.

The image grabbing stage comprises the following steps: The sensor acquires the reference image and outputs data representing the reference image to the computer: A program or programs implemented by the computer then analyzes the reference image data to define a gage length and concurrently displays or may display the reference image, preferably in real time, on a computer monitor or other display device. Following the analysis step, the computer stores the analyzed reference image data. Once the reference image has been acquired, analyzed, and stored, the sensor acquires a subsequent image and outputs data representing that subsequent image (that is, the current subsequent image) to the computer.

Acquisition of subsequent images can take place either continuously or at predetermined intervals, or it can be triggered by an external event such as the application of a load. The number of subsequent images thus can range from one to thousands. Once data representing a subsequent image is input to the computer, the program analyzes it to define a gage length and concurrently displays the corresponding subsequent image, preferably in real time, on a computer monitor or other display device (preferably on the same monitor or other display device on which the reference image is being displayed, to facilitate comparison). Following the analysis step, the computer stores the analyzed subsequent image data for the current subsequent image.

The strain analysis stage takes place following the image grabbing stage, and is carried out each time a subsequent image is acquired. In the strain analysis stage, the computer calculates the strain from the stored reference image data and the stored subsequent image data for the current subsequent image, based on the changes in the gage length as a function of time and change in the load. Thus, a new strain calculation is made for each subsequent image. The strain calculation can then be utilized as a display, as well as providing information on fatigue damage or strain hysteresis for materials of known and unknown mechanical properties, providing advance notice of an approaching failure point for materials of known mechanical properties, extrapolating a failure point for a material of unknown mechanical properties, or based on collected damage accumulation data.

The data logging stage takes place following each iteration of the strain analysis stage. In the data logging stage, the program gets the current results and writes them to a log file.

As will be appreciated by those of skill in the art, the flow diagram of FIGS. 6A and 6B is for purposes of illustration, and some changes can be made in the algorithm without affecting the results. For example, the display of the reference and subsequent images can take place sequentially with the analysis of those images, as well as substantially concurrently; the acquisition and display of the reference and/or the subsequent images can be initiated by an external event; and images can be recorded during an event and stored for processing at a later time.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

We claim:

1. An optical strain gage comprising:
a target comprising a set of parallel lines in the form of a one-dimensional barcode, two of the parallel lines being chosen as end lines, and a gage length defined by and perpendicular to the end lines, the target being adapted for association with a body for which at least one of strain and fatigue damage is to be calculated in such a way that deformation of the gage length and deformation under load of the body with which the target is associated bear a one-to-one relationship, and being adapted to emit a detectable physical quantity, wherein the one-dimensional barcode is based on the Code 39 barcode standard, and includes start and stop characters and a sequential string of a plurality of intermediate characters that hold the actual coded information, each character being defined by a total of nine bars and spaces;
a sensor compatible with and adapted to pre-process the detectable physical quantity emitted by the target and output data representing the physical quantity;
means for analyzing the data output by the sensor to define the gage length of the target; and
means for calculating at least one of the strain and the fatigue damage on the body directly, based on the pre-processed and analyzed data.

2. The optical strain gage of claim 1, wherein the start and stop character of the one-dimensional barcode is the letter "A" the ratio of wide bars to narrow bars is 2:1, and the one-dimensional barcode includes a perimeter incorporating a conventional barcode quiet zone.

3. The optical strain gage of claim 1, wherein the one-dimensional barcode includes human-readable encoded information not required by the Code 39 barcode standard.

4. The optical strain gage of claim 1, wherein the means for calculating at least one of the strain and the fatigue damage on the body directly calculates strain based on changes in the gage length as a function of time and change in the load on the body.

* * * * *